United States Patent [19]

Braunisch et al.

[11] Patent Number: 4,949,233

[45] Date of Patent: Aug. 14, 1990

[54] POWER SUPPLY CIRCUIT IN MICROWAVE OVENS

[75] Inventors: Eckart Braunisch, Kimstad; Jan Önnegren, Norrköping, both of Sweden

[73] Assignee: U.S. Philips Corporation, New York, N.Y.

[21] Appl. No.: 372,573

[22] Filed: Jun. 27, 1989

[30] Foreign Application Priority Data

Jul. 6, 1988 [SE] Sweden ............................... 8802529

[51] Int. Cl.[5] ........................ H02M 3/335; H05B 6/66

[52] U.S. Cl. ........................................ 363/28; 363/86; 363/135; 219/10.55 B

[58] Field of Search ........................ 363/27, 28, 85, 86, 363/96, 128, 135; 323/267; 219/10.55 B

[56] References Cited

U.S. PATENT DOCUMENTS

| | | | |
|---|---|---|---|
| 3,303,405 | 2/1967 | Schwarz | 363/28 |
| 4,055,791 | 10/1977 | Bland et al. | 363/28 |
| 4,096,559 | 6/1978 | Sakurada et al. | 363/28 |
| 4,142,082 | 2/1979 | Israel | 219/10.55 B |
| 4,275,281 | 6/1981 | Kiuchi | 363/135 |
| 4,383,156 | 5/1983 | Furusawa | 219/10.55 B |
| 4,409,647 | 10/1983 | Terkanian | 363/135 |
| 4,539,453 | 9/1985 | Miyazaki et al. | 219/10.55 B |

*Primary Examiner*—Peter S. Wong
*Attorney, Agent, or Firm*—Bernard Franzblau

[57] ABSTRACT

A power supply circuit for a high-frequency source (M) in a microwave oven includes a switched-mode-power-supply unit having a resonant circuit which contains a coil (L2) and a controllable switch (D1). The switching of the controllable switch is controlled by a control circuit (K) via a driving stage (S). The power supply circuit is cooled by a fan (F). The required DC voltages for supplying the driving stage, control circuit and fan are obtained by means of an auxiliary winding (W1, W2) on the coil (L2) and a rectifier (D3, D4). This results in a saving in both space and costs. At the same time, automatic supervision of the different functional units of the power supply circuit is obtained.

10 Claims, 1 Drawing Sheet

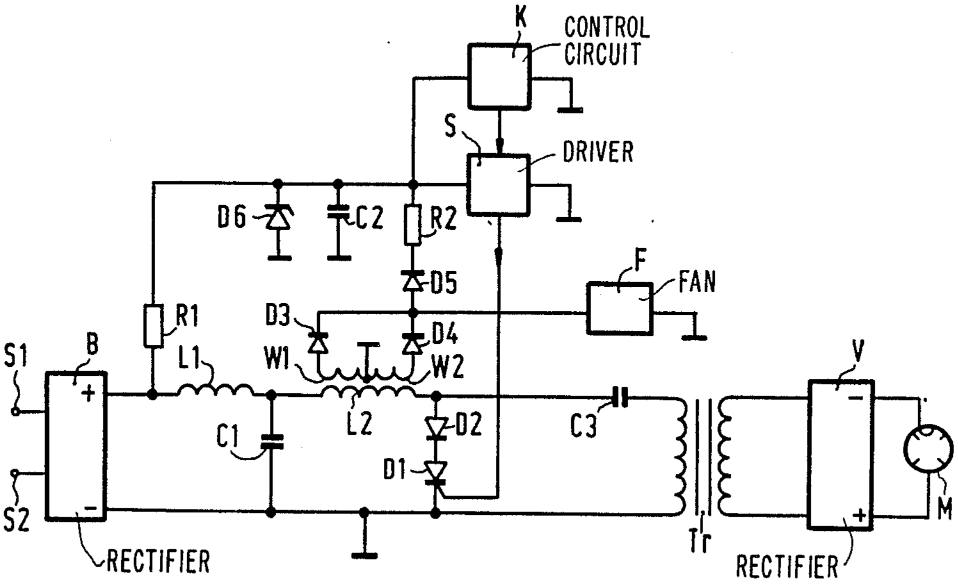
K
CONTROL CIRCUIT
S
DRIVER
D6
C2
R2
D5
F
FAN
R1
D3
D4
S1
B
L1
W1
W2
V
C3
L2
D2
C1
D1
S2
RECTIFIER
Tr
RECTIFIER
M

POWER SUPPLY CIRCUIT IN MICROWAVE OVENS

This invention relates to a power supply circuit for a high-frequency (HF) energy source in a microwave oven comprising a mains rectifier for producing a rectified mains voltage and a switched-mode-power-supply (SMPS) unit driven by the rectified mains voltage. The SMPS unit comprises a coil included in a resonant circuit, a controllable switch, a driving stage fed by a DC voltage and producing drive current pulses for switching the controllable switch between its open and its closed condition, and a control circuit connected to the driving stage for controlling the switching frequency of the drive current pulses. The resonant circuit also includes capacitances and reactive impedances appearing at the primary side of a transformer, the secondary side of which is connected to means for supplying a drive voltage to the HF source.

The controllable switch may be realized as a so-called gate turn-off thyristor (GTO), which requires a substantial driving current to make it switch. This means that the driving stage of the switch also will require a substantial amount of DC power to be able to deliver the required driving current to the switch. Furthermore, this type of power supply circuit usually comprises a fan for cooling the components of the circuit and the HF source including a magnetron tube. In order to obtain an effective cooling of the components included in the power supply circuit and a compact construction of the circuit as a whole with small dimensions of the fan, the fan is preferably realized as a DC-driven fan. Such a DC-driven fan will require a high DC power to drive it.

SUMMARY OF THE INVENTION

An object of the invention is to produce the DC voltages required for driving the circuit in a simple manner and at the same time to supervise the different functional units included in the circuit.

According to the invention, a power supply circuit of the type described in the opening paragraph is characterized in that the SMPS unit further comprises an auxiliary winding on the coil of the resonant circuit, a rectifier connected to the auxiliary winding for producing a rectified auxiliary voltage, a capacitor connected across a DC feed input of the driving stage, and means for applying the rectified auxiliary voltage and the rectified mains voltage to the DC feed input of the driving stage. The capacitor is dimensioned so as to serve both as a storage capacitor for the rectified mains voltage to deliver the DC voltage to the driving stage when starting the operation of the resonant circuit, and as a smoothing capacitor for the rectified auxiliary voltage when the resonant circuit is in normal operation.

A preferred embodiment comprises a fan which is driven by a DC voltage, in which case both the fan and the drive stage and control circuit obtain their DC driving voltages from the rectifier coupled to the auxiliary winding on the coil when the resonant circuit is operating normally. The fan is then connected substantially directly to the rectifier, whereas the DC feed inputs of the driving stage and the control circuit are connected in parallel and to the rectifier via a diode which prevents current flow from the capacitor, connected in parallel across the said inputs, to the fan.

First of all, the invention results in a great simplicity in the construction of the circuit. Thus it is possible to avoid a separate mains transformer for the voltage supply of the driving stage and the fan, which otherwise is a common solution. Furthermore, due to the fact that the driving stage obtains its current supply from the resonant circuit, which in its turn depends upon driving current from the driving stage to be able to operate, a mutual dependence will be obtained which results in an automatic supervision of the functional units included in the circuit. Faults in one of the parts then will result in the automatic cut-off of the circuit.

In the case where both the driving stage and the control circuit and the fan obtain their current supply from the auxiliary winding on the coil in the resonant circuit, the following fault conditions can appear:

1. Faults in the resonant circuit cause the cooling fan and the driving stage with its control circuit to stop operation due to a DC voltage supply interruption.

2. Faults in the control circuit or the driving stage cause the resonant circuit to stop operating due to a missing or erroneous control. Then also the control circuit and the driving stage will lose their DC voltage supply and the cooling fan will stop due to a DC voltage supply interruption.

3. Faults in the cooling fan cause the resonant circuit to stop operating because certain power semniconductors will become defective due to overheating, whereby the cooling fan and the control circuit and driving stage will lose their DC voltage supply.

All the said fault conditions will result in a blown fuse or that the circuit will stop operating or cannot be started.

BRIEF DESCRIPTION OF THE DRAWING

The invention will be described with reference to the attached drawing which shows a circuit diagram, partly as a block diagram, of an exemplary power supply circuit according to the invention.

DESCRIPTION OF THE PREFERRED EMBODIMENTS

The circuit comprises a full-wave mains rectifier B, which is fed by a mains (AC) supply voltage applied to the terminals S1 and S2, and is followed by a choke coil L1. After the coil L1 follows there is a resonant circuit comprising a capacitor C1, a coil L2, a capacitor C3 and a transformer Tr. The secondary winding of the transformer is connected to a rectifying voltage doubler circuit V which delivers a DC current at a high voltage to a magnetron M. The resonant circuit also includes the leakage inductance of the transformer Tr and the reactive impedances (capacitances) present in the voltage doubler circuit V and transformed to the primary side of the transformer. By means of a semiconductor switch D1, which in the example shown is connected in series with a power diode D2 across the resonant circuit between ground and the interconnection point of the coil L2 and the capacitor C3, the circuit is switched between two conditions at a relatively high switching frequency. In one condition, when the switch D1 is open, a resonant circuit is formed by the coil L2 together with the capacitor C3 and the reactive impedances appearing at the primary side of the transformer Tr. In the second condition, when the switch D1 is closed, the coil L2 is connected directly to the output of the mains rectifier B via the smoothing circuit L1, C1 and a resonant circuit is formed by the capacitor C3 together with the said impedances at the primary side of the transformer Tr.

The switch D1 may consist of a so-called gate turn-off thyristor and is switched between its open and its closed condition by means of a pulsed driving current from a driving stage S. The switching frequency of the drive current pulses is variable and is controlled by a control circuit K. By varying the switching frequency, the power of the magnetron M can be varied. The driving stage S as well as the control circuit K are supplied with a DC voltage at a feed input.

Furthermore, a fan F is provided for cooling the components included in the power supply circuit as well as the magnetron M. In order to obtain an effective cooling, small-sized components in the circuit and also a fan of small dimensions, the fan is a DC-driven fan.

According to the invention the DC power for driving the fan F, the driving stage S and the control circuit K is produced by means of an auxiliary winding, in the embodiment shown consisting of two partial windings W1 and W2, on the coil L2, and a full-wave rectifier in the form of two diodes D3 and D4 connected to the partial windings W1, W2. The DC feed input of the fan F is connected directly to the interconnection point of the two diodes D3 and D4 forming the output of the rectifier and so tha fan F is driven by the unsmoothed rectified auxiliary voltage. The DC feed inputs of the driving stage S and the control circuit K are connected to the rectifier output (DC, D4) through a diode D5 in series with a resistor R2. The DC feed inputs of the driving stage S and the control circuit K are furthermore connected to the positive terminal of the mains rectifier B through a resistor R1 and to the negative terminal (ground) of the mains rectifier through a capacitor C2 and a Zener-diode D6 connected in parallel across these DC feed inputs. The power operation of the power supply circuit is as follows:

When the mains rectifier B is connected to the mains supply, the capacitor C2 will be charged via resistor R1 and will deliver a DC driving voltage to the control circuit K and the driving stage S. The Zener-diode D6 then serves to limit and to stabilize the DC voltage at the DC feed inputs of the driving stage S and the control circuit K. In this situation the diode D5 will prevent the flow of current from the capacitor C2 to the DC-driven fan F. When the control circuit K receives its starting signal, the control circuit K and the driving stage S will begin to operate on the energy stored in the capacitor C2. The driving stage S turns the tyristor D1 on and off at a frequency determined by the control circuit K so that oscillations in the resonant circuit will start. The alternating current in the coil L2 is transformed to the partial windings W1 and W2 and the transformed current is rectified by the diodes D3 and D4. The fan F receives its DC driving voltage and starts to operate. The current from the rectifier D3, D4 will also flow through the diode D5 and the resistor R2 and will keep the capacitor C2 charged to the value determined by the Zener diode D6. The DC voltage supplied to the driving stage S will now substantially be taken from the rectifier D3, D4 and the capacitor C2 then will serve as a smoothing capacitor for the rectified auxiliary voltage. As mentioned, when starting the power supply circuit, the capacitor C2 serves as a storage capacitor and to this end the capacitor C2 is so dimensioned that the driving stage S is enabled, with sufficient certainty, to start the operation of the resonant circuit on the energy stored in the capacitor C2 until the DC voltage supply of the stage S can be taken-over by the current in the coil L2 via the windings W1, W2 and the rectifier D3, D4.

We claim:

1. A power supply circuit for a high-frequency energy source in a microwave oven comprising; a rectifier, coupled to terminals of an AC supply voltage, for producing a rectified supply voltage and a switched-mode-power-supply (SMPS) unit driven by the rectified supply voltage; the SMPS unit comprising, a coil included in a resonant circuit, a controllable switch, a driving stage fed by a DC voltage and producing drive current pulses for switching the controllable switch between its open and its closed condition, a control circuit connected to the driving stage for controlling the frequency of the drive current pulses, the resonant circuit further including capacitances and reactive impedances appearing at the primary side of a transformer having a secondary side connected to means for supplying a drive voltage to the high-frequency source, an auxiliary winding coupled to the coil of the resonant circuit, a rectifier connected to the auxiliary winding for producing a rectified auxiliary voltage, a capacitor connected across a DC feed input of the driving stage, and means for applying the rectified auxiliary voltage and the rectified supply voltage to the DC feed input of the driving stage, said capacitor being dimensioned so as to serve both as a storage capacitor for the rectified supply voltage to deliver the DC voltage to the driving stage when starting the operation of the resonant circuit and as a smoothing capacitor for the rectified auxiliary voltage when the resonant circuit is in normal operation.

2. A power supply circuit as claimed in claim 1, where the power supply circuit further comprises a DC fed fan for cooling components of said circuit as well as the high frequency source, wherein, during normal operation, the driving stage, the control circuit and the fan are DC fed by the rectified auxiliary voltage, the rectified auxiliary voltage being applied substantially directly to a DC feed input of the fan and being applied to parallel connected DC feed inputs of the driving stage and the control circuit through means including a diode connected so as to prevent current flow from said capacitor to the DC feed input of the fan.

3. A switched mode power supply circuit for a high-frequency energy source comprising;

- a pair of input terminals for supplying a rectified DC voltage to said switched mode power supply (SMPS) circuit,
- a resonant circuit including an inductor,
- a transformer having a primary winding and a secondary winding coupled to said high-frequency energy source,
- means coupling said resonant circuit to said input terminals and to said primary winding,
- a semiconductor controllable switch coupled to said resonant circuit,
- a driver stage energized at a DC input by said DC voltage and thereby producing drive current pulses for switching the controllable switch,
- a control circuit connected to the driver stage for controlling the frequency of the drive current pulses,
- the resonant circuit further including at least one capacitance and a reactive impedance appearing at the primary side of said transformer,
- an auxiliary winding coupled to the inductor of the resonant circuit, a rectifier connected to the auxiliary winding for producing a rectified auxiliary voltage, a capacitor connected to said DC input of the driver stage, and means for applying the rectified auxiliary voltage to the DC input of the driver stage, and wherein the capacitance of said capacitor is chosen so that the capacitor operates both as a storage capacitor for the rectified DC voltage to deliver a DC voltage to the driver stage to start the operation of the resonant circuit and as a smoothing capacitor for the rectified auxiliary voltage when the resonant circuit is in normal operation.

4. A power supply circuit as claimed in claim 3 further comprising;

a DC energized fan for cooling components of said circuit and said high-frequency energy source, and wherein said auxiliary voltage applying means supplies the control circuit and the fan with the rectified auxiliary voltage, the rectified auxiliary voltage being applied substantially directly to a DC supply input of the fan, and the auxiliary voltage applying means includes a diode connected so as to prevent current flow from said capacitor to the DC supply input of the fan.

5. A power supply circuit as claimed in claim 3 further comprising a second inductor for coupling the resonant circuit to said input terminals.

6. A power supply circuit as claimed in claim 5 wherein said resonant circuit further comprises a second capacitor coupled to the first and second inductors, and said semiconductor switch is connected to said resonant circuit such that when the switch is opened the resonant circuit includes all of its components and when the switch is closed the resonant circuit includes less than all of said components.

7. A power supply circuit as claimed in claim 5 wherein said resonant circuit comprises, a second capacitor connected in a series circuit with said second inductor across said pair of input terminals, means connecting the first inductor, said capacitance and said primary winding in a second series circuit across the second capacitor, and means coupling said semiconductor switch across a part of the second series circuit that includes the capacitance and the primary winding.

8. A power supply circuit as claimed in claim 3 wherein said control circuit controls said driver stage so as to vary the frequency of the drive current pulses and thereby the power of said high-frequency energy source.

9. A power supply circuit as claimed in claim 8 wherein said high-frequency energy source comprises a magnetron.

10. A power supply circuit as claimed in claim 9 further comprising a DC fan arranged to cool the magnetron and directly coupled via said auxiliary voltage applying means to an output of said rectifier, and wherein said auxiliary voltage applying means includes a diode connected so as to prevent a current flow from the capacitor to the DC fan.

* * * * *